(12) United States Patent
Adams et al.

(10) Patent No.: US 11,578,421 B2
(45) Date of Patent: Feb. 14, 2023

(54) SYSTEMS, DEVICES, AND METHODS FOR ELECTROPLATED ZINC NEGATIVE ELECTRODES FOR ZINC METAL CELLS AND BATTERIES

(71) Applicant: Salient Energy Inc., Dartmouth (CA)

(72) Inventors: Brian D. Adams, Dartmouth (CA); Marine B. Cuisinier, Dartmouth (CA); John Philip S. Lee, Dartmouth (CA)

(73) Assignee: Salient Energy Inc., Dartmouth (CA)

( * ) Notice: Subject to any disclaimer, the term of this patent is extended or adjusted under 35 U.S.C. 154(b) by 0 days.

(21) Appl. No.: 17/291,571

(22) PCT Filed: Nov. 6, 2019

(86) PCT No.: PCT/CA2019/051579
§ 371 (c)(1),
(2) Date: May 5, 2021

(87) PCT Pub. No.: WO2020/093157
PCT Pub. Date: May 14, 2020

(65) Prior Publication Data
US 2022/0010453 A1   Jan. 13, 2022

Related U.S. Application Data

(60) Provisional application No. 62/756,241, filed on Nov. 6, 2018.

(51) Int. Cl.
*C25D 3/22* (2006.01)
*C25D 5/00* (2006.01)
(Continued)

(52) U.S. Cl.
CPC ............... *C25D 17/10* (2013.01); *C25D 3/24* (2013.01); *C25D 5/18* (2013.01); *C25D 7/00* (2013.01); *H01M 4/045* (2013.01); *H01M 4/38* (2013.01)

(58) Field of Classification Search
CPC .. C25D 3/22; C25D 5/00; C25D 5/18; H01M 4/045; H01M 4/0452
(Continued)

(56) References Cited

U.S. PATENT DOCUMENTS 3,824,158 A * 7/1974 Rosenberg ............... C25D 3/22
205/310
6,187,475 B1   2/2001 Oh et al.
(Continued)

FOREIGN PATENT DOCUMENTS

CN       105576277 A  *  5/2016  ............ H01G 11/04
CN       207097981 U  *  3/2018  .......... H01M 10/052
(Continued)

OTHER PUBLICATIONS

Yan et al., "Superior Cycling Stability and High Rate Capability of Three-Dimensional Zn/Cu Foam Electrodes for Zinc-Based Alkaline Batteries," RSC Advances, (2015), vol. 5, No. 102, pp. 83781-83787. (Year: 2015).*
(Continued)

*Primary Examiner* — Edna Wong
(74) *Attorney, Agent, or Firm* — Own Innovation; James W. Hinton

(57) ABSTRACT

A method of fabricating and using a zinc negative electrode and systems thereof are described. A zinc electroplated electrode including a layer of zinc metal bonded to a surface of an electrically conductive current collector is fabricated by an electroplating process using a zinc electroplating system. The zinc electroplating system includes: a zinc metal anode, a cathode including the current collector for plating zinc thereon, and an electrolyte bath comprising zinc ions. The electroplating process bonds the zinc metal to the surface of the current collector to create the electroplated zinc electrode. The electroplated zinc electrode is used as a
(Continued)

negative electrode in a zinc metal cell. The zinc metal cell may be a primary cell or a secondary cell.

8 Claims, 7 Drawing Sheets

(51) Int. Cl.
　　*C25D 5/18*　　(2006.01)
　　*C25D 17/10*　　(2006.01)
　　*C25D 3/24*　　(2006.01)
　　*C25D 7/00*　　(2006.01)
　　*H01M 4/04*　　(2006.01)
　　*H01M 4/38*　　(2006.01)

(58) Field of Classification Search
　　USPC ........ 205/104, 137, 143, 145, 305; 429/523, 429/535
　　See application file for complete search history.

(56) References Cited

U.S. PATENT DOCUMENTS

2006/0115724 A1* 6/2006 Buckle ................ H01M 50/133
　　　　　　　　　　　　　　　　　　148/675
2008/0187824 A1* 8/2008 Tomantschger ........ H01M 4/14
　　　　　　　　　　　　　　　　　　429/122

FOREIGN PATENT DOCUMENTS

KR　　1020160129980 A　*　11/2016　............ H01M 10/54
WO　　WO-2018090161 A1　*　5/2018　............ H01M 10/36

OTHER PUBLICATIONS

Raicheff et al., "Novel Current Collector and Active Mass Carrier of the Zinc Electrode for Alkaline Nickel-Zinc Batteries," Bulgarian Chemical Communications (Jan. 1, 2016), vol. 48, No. 1, pp. 61-65. (Year: 2016).*
Zhao et al., "Unravelling the Reaction Chemistry and Degradation Mechanism in Aqueous Zn/MnO2 Rechargeable Batteries," Journal of Materials Chemistry A (2018), vol. 6, No. 14, pp. 5733-5739. (Year: 2018).*
Hu et al., "Effect of Electrolyte Composition on Zn Electrode in Weak Acidic Aqueous Electrolyte," Int. J. Electrochem. Sci. (Oct. 1, 2016), vol. 11, pp. 8571-8580. (Year: 2016).*
CIPO as International Searching Authority, International Search Report and Written Opinion for PCT/CA2019/051579, dated Jan. 28, 2020.
Mainar et al., "A brief overview of secondary zinc anode development: The key of improving zinc-based energy storage systems", International Journal of Energy Research, vol. 42, Issue 3, pp. 903-918, Mar. 10, 2018.
Mainar et al., "Enhancing the Cycle Life of a Zinc-Air Battery by Means of Electrolyte Additives and Zinc Surface Protection", Batteries 2018, 4, 46, Sep. 13, 2018.

* cited by examiner

SYSTEMS, DEVICES, AND METHODS FOR ELECTROPLATED ZINC NEGATIVE ELECTRODES FOR ZINC METAL CELLS AND BATTERIES

TECHNICAL FIELD

The following relates generally to electrochemical cells (hereafter, cells), and more particularly to electrochemical cells that use metallic zinc as an electrode.

INTRODUCTION

The following paragraphs are not an admission that anything discussed in them is prior art or part of the knowledge of persons skilled in the art.

Primary and secondary electrochemical cells employing zinc metal have been used in commercial applications for well over a century. Zinc is inexpensive, non-toxic, is stable in water due to a high overpotential for hydrogen evolution and has a low redox potential (−0.76 V vs. standard hydrogen electrode (SHE)) compared to other negative electrode materials used in aqueous batteries.

Maintaining a high electrical conductivity throughout the zinc electrode is important in achieving the highest possible utilization of zinc metal. For primary (i.e. non-rechargeable) cells, zinc is stripped from the negative electrode during discharge. If a sufficient conductivity is not maintained, some of the zinc metal will be inactive and remain at the negative electrode. This leads to unnecessary mass and volume of zinc which decreases the specific energy and energy density of the cell. The same is true for secondary (i.e. rechargeable) cells, but the effects are increased. For a secondary cell, stripping of zinc metal from the negative electrode occurs during discharge and plating of zinc metal back onto the negative electrode occurs during re-charge. For a zinc electrode with low conductivity, increased polarization may occur, and non-uniform stripping/plating can lead to the growth of dendrites and internal short-circuits which may diminish or reduce entirely the discharge capacity of the cell.

Zinc electrodes can take on several different forms depending on the cell type and format. The zinc electrode may be the can of a cell casing or a rod within the casing. The zinc electrode may be in the form of zinc powder as a slurry/paste applied to a conductive current collector; however, zinc powder is highly susceptible to oxidation in air or certain electrolytes. An oxide layer, which is electrically insulating, may form on the outer surface of zinc particles, preventing the metallic zinc from being accessed if the oxidation is too severe.

Accordingly, there is a need in the art for zinc electrodes that overcome at least some of the deficiencies and disadvantages of existing zinc electrodes, such as low conductivity, high polarization, non-uniformity, and reduced capacity.

SUMMARY

A method of fabricating a zinc electroplated electrode for use in a cell is provided herein. The method includes: fabricating an electroplated zinc electrode including a layer of zinc metal bonded to a surface of a current collector using an electroplating process, wherein the electroplating process uses a zinc electroplating system, the zinc electroplating system including: an anode comprising zinc metal; a cathode including the current collector for plating zinc thereon, the current collector including an electrically conductive substrate; and an electrolyte bath comprising $Zn^{2+}$ cations or $[Zn(OH)_4]^{2-}$ ions; wherein the electroplating process bonds the zinc metal to the current collector; and using the electroplated zinc electrode as a negative electrode in a zinc metal cell, wherein the zinc metal cells includes the negative electrode, a positive electrode, and an electrolyte.

The zinc metal layer fabricated by this method may have a density greater than 5 g/cc or a density greater than 6 g/cc.

The zinc metal layer may have a thickness between 0.05 µm to 50 mm.

The electroplated zinc electrode may be electroplated using a batch process and the batch process may include rack electroplating or barrel electroplating.

The electroplated zinc electrode may be electroplated using a continuous process and the continuous process may be roll-to-roll electroplating or reel-to-reel electroplating.

The zinc metal of the anode may be in the form of balls, foil, rod, sheet, wire, plate, foam, sponge, mesh, or bar.

The anode may be an anode basket or bag containing zinc metal and the anode basket or bag may be composed of titanium, stainless steel, tantalum, zirconium, or other corrosion resistant material.

The current collector may have an electrically conductive surface.

The current collector may be a foil, wire, sheet, plate, foam, sponge, mesh, rod, bar, can, or lid.

The electrolyte bath may be an alkaline non-cyanide zinc bath and the alkaline non-cyanide zinc bath may contain an excess of hydroxide ions (OH⁻), an excess of zincate ions ($[Zn(OH)_4]^{2-}$), or an excess of hydroxide ions and an excess of zincate ions, wherein the pH of the electrolyte bath is >7.

The electrolyte bath may be a cyanide zinc bath and the cyanide zinc bath may contain dissolved zinc cyanide ($Zn(CN)_2$).

The electrolyte bath is an acid sulfate zinc bath and the acid sulfate zinc bath may contain dissolved zinc sulfate ($ZnSO_4$), wherein the pH of the electrolyte bath is <7.

The electrolyte bath may be an acid chloride zinc bath and the acid chloride zinc bath may contain dissolved zinc chloride ($ZnCl_2$), wherein the pH of the electrolyte bath is <7.

The electrolyte bath may be maintained at room temperature in the absence of a temperature controller for the electrolyte bath.

The electrolyte bath may be heated and maintained at a constant temperature between 20° C. and 60° C.

The zinc metal from the anode may be plated onto the current collector by applying a voltage difference between the anode and the cathode. The voltage difference may be applied using a constant voltage or a voltage pulse.

The zinc from the anode may be plated onto the current collector by applying a current between the anode and the cathode. The current may be applied using a constant current or a current pulse.

The negative electrode may be ionically connected to the positive electrode by the electrolyte.

The negative electrode in the cell includes a zinc metal layer in direct electrical contact with the current collector.

The zinc metal layer of the negative electrode in the cell includes a first side in contact with the current collector and a second side in contact with the electrolyte.

The electrolyte may be an aqueous solution, a non-aqueous solution, a solid-state membrane, or an ionomer.

The positive electrode may be an air electrode, an intercalation electrode, a conversion electrode.

The positive electrode may be an inert substrate at which redox molecules dissolved in the electrolyte can reduce or oxidize.

The zinc metal cell may be a primary non-rechargeable battery, wherein the primary battery is an alkaline battery, a zinc-carbon battery, a zinc-chloride battery, or a zinc-air battery.

The zinc metal cell may be a rechargeable battery, wherein the rechargeable battery is a zinc-air battery, a zinc-ion battery, a zinc-halide battery, a nickel-zinc battery, an alkaline manganese dioxide-zinc battery, a zinc-iron battery, or a zinc-cesium battery.

Another method of fabricating a zinc metal electrode for use in a zinc metal cell is also provided herein. The method includes: providing a zinc electroplating system including an anode comprising zinc metal; a cathode comprising a current collector for plating zinc thereon; and an electrolyte bath comprising $Zn^{2+}$ cations or $[Zn(OH)_4]^{2-}$ ions; applying a current or voltage between the anode and the cathode; and depositing a zinc layer onto the current collector, wherein the deposited zinc layer is bonded to the current collector.

A method of using a zinc metal cell is provided herein. The method includes: providing a zinc metal cell including a negative electrode, comprising an electroplated zinc metal electrode, and a positive electrode and discharging the zinc metal cell under an electrical load, whereby zinc is stripped from the negative electrode while $Zn^{2+}$ cations or zincate ions migrate towards the positive electrode through an electrolyte. Wherein, the negative electrode is fabricated according to an electroplating process using a zinc electroplating system, the zinc electroplating system including: an anode comprising zinc metal; a cathode comprising a current collector for plating zinc thereon; and an electrolyte bath comprising $Zn^{2+}$ cations or $[Zn(OH)_4]^{2-}$ ions; wherein the electroplating process strongly bonds the zinc metal to the current collector.

A system for fabricating and using an electroplated zinc metal electrode is provided herein. The system includes: a zinc electroplating subsystem for fabricating the electroplated zinc metal electrode, the subsystem including: an anode comprising zinc metal; a cathode comprising a current collector for plating zinc metal thereon; and an electrolyte bath comprising $Zn^{2+}$ cations or $[Zn(OH)_4]^{2-}$ ions; wherein the zinc electroplating subsystem is configured to deposit a zinc metal layer onto a surface of the current collector in response to the application of a current or voltage between the anode and the cathode; and wherein the current collector having the zinc metal layer deposited thereon forms the electroplated zinc metal electrode; and a zinc metal cell comprising: a negative electrode comprising the electroplated zinc metal electrode; and a positive electrode, wherein during discharge under an electrical load, zinc is stripped from the negative electrode while $Zn^{2+}$ cations or zincate ions migrate towards the positive electrode through the electrolyte.

A zinc electroplating system for fabricating an electroplated zinc metal electrode is provided herein. The zinc electroplating system including: an anode comprising zinc metal; a cathode comprising a current collector for plating zinc thereon; and an electrolyte bath including $Zn^{2+}$ cations or $[Zn(OH)_4]^{2-}$ ions; wherein the zinc electroplating system is configured to deposit a zinc metal layer onto a surface of the current collector in response to the application of a current or voltage between the anode and the cathode; and wherein the current collector having the zinc metal layer deposited thereon forms the electroplated zinc metal electrode.

A zinc metal cell is provided herein. The cell including: a negative electrode comprising an electroplated zinc metal electrode fabricated according to an electroplating process using a zinc electroplating system, the zinc electroplating system including: an anode comprising zinc metal; a cathode comprising a current collector for plating zinc thereon; and an electrolyte bath comprising $Zn^{2+}$ cations or $[Zn(OH)_4]^{2-}$ ions; wherein the electroplating process bonds the zinc metal to the collector; and a positive electrode; wherein, during discharge of the zinc metal cell under an electrical load, zinc from the zinc metal layer is stripped from the negative electrode while $Zn^{2+}$ cations or zincate ions migrate towards the positive electrode through an electrolyte.

The following is intended to introduce the reader to the detailed description that follows and not to define or limit the claimed subject matter.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The present disclosure relates generally to electrochemical cells, and more particularly to electrochemical cells that use metallic zinc as a negative electrode. The systems, methods, and zinc metal electrodes described herein may improve the performance of primary and secondary electrochemical cells that use zinc metal as the negative electrode.

Figure 1:
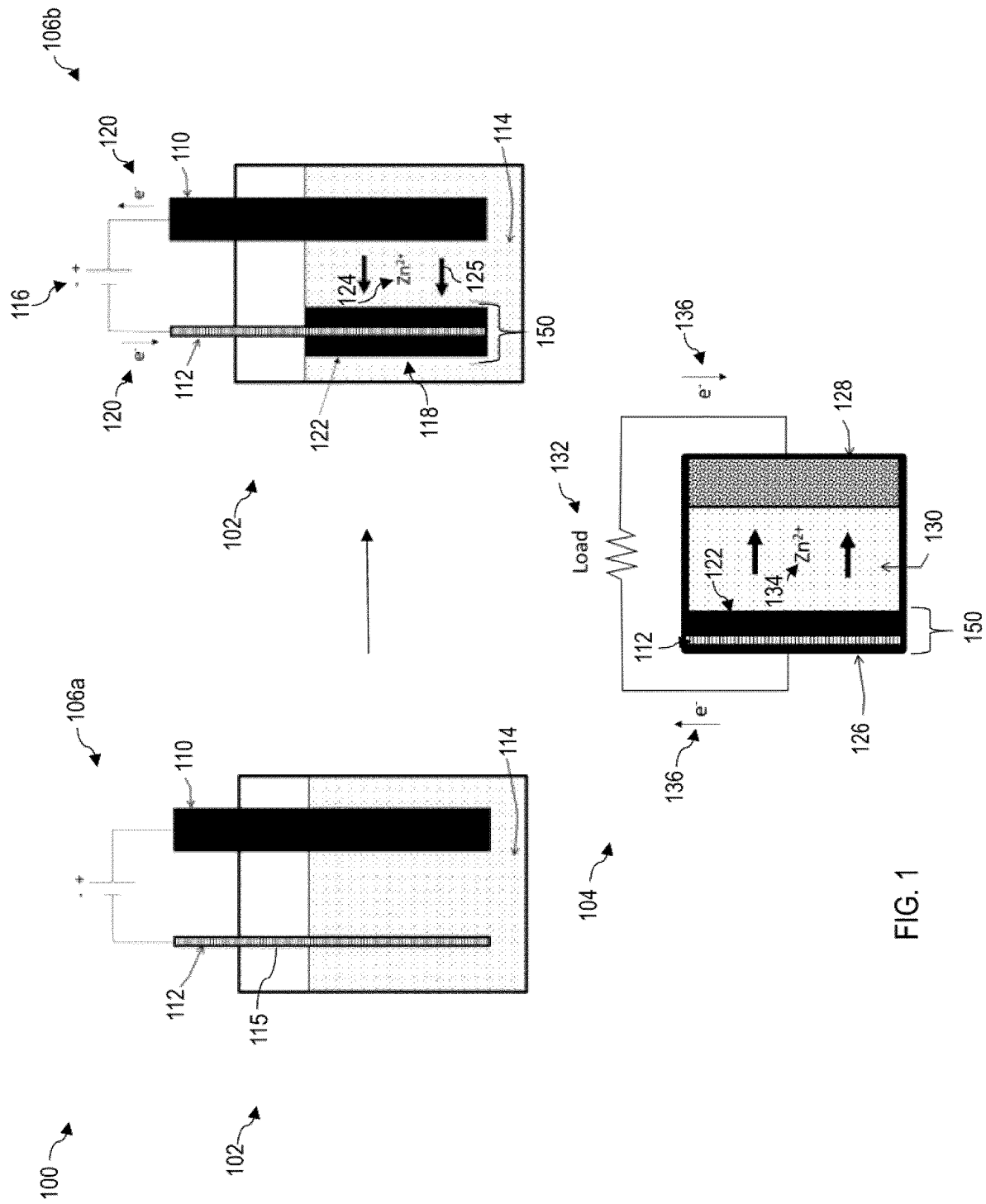
FIG. 1 is a schematic diagram of a system for fabricating and using an electroplated zinc electrode, according to an embodiment.

Referring now to FIG. 1, shown therein is a system 100 for fabricating and using an electroplated zinc metal electrode, according to an embodiment.

The system 100 includes a zinc electroplating subsystem 102 and a zinc cell 104.

Generally, as described herein, the zinc electroplating subsystem 102 can be used to fabricate an electroplated zinc metal electrode via an electroplating process. The electroplated zinc metal electrode fabricated using the zinc electroplating subsystem 102 can then be used as an electrode in the zinc cell 104. The electroplated zinc electrode, and the zinc cell 104 in which it is used, may have improved performance over existing zinc electrodes and zinc cells.

The zinc electroplating subsystem 102 fabricates an electroplated zinc electrode 150 via an electroplating process carried out by the subsystem 102. The zinc electroplating subsystem 102 is shown in an initial setup stage 106a and a deposition stage 106b.

The initial setup stage 106a shows the subsystem 102 before zinc is plated or deposited.

The deposition stage 106b shows the subsystem 102 during or after deposition (or plating) of zinc. The deposition stage 106b produces the electroplated zinc electrode 150 from the initial setup 106a.

In the initial setup 106a, the electroplating subsystem 102 includes an anode 110, a current collector 112, and an electrolyte bath 114. FIG. 1 shows the anode 110 and current collector 112 partially submerged in the electrolyte bath 114.

The anode 110 comprises zinc metal. The zinc metal may be in any suitable form such as balls, foil, rod, sheet, wire, plate, foam, sponge, mesh, or bar. The zinc metal may be contained in an anode container. The anode container may be an anode basket or bag. The anode container may be made from titanium, stainless steel, tantalum, zirconium, or other corrosion-resistant yet conductive material.

The current collector 112 comprises an electrically conductive substrate. The current collector 112 may be any electrically conductive material. Selection of the conductive material may depend on its stability in the electrolyte bath 114 and an electrolyte of the electrochemical cell 104 (i.e. electrolyte 130 described below) in which the resulting electroplated zinc electrode 150 may be used as a negative electrode.

The current collector 112 includes an exterior surface 115 that is in direct contact with the electrolyte bath 114.

The electrolyte bath 114 contains $Zn^{2+}$ cations or $[Zn(OH)_4]^{2-}$ ions (zincate ions). The electrolyte bath 114 serves as a medium to transport the $Zn^{2+}$ ions or zincate ions form the anode 110 to the current collector 112.

The electrolyte bath 114 may be an alkaline non-cyanide zinc bath. The alkaline non-cyanide zinc bath may contain an excess of hydroxide ions (OH—) and/or zincate ions ($[Zn(OH)_4]^{2-}$) and have a pH >7.

The electrolyte bath 114 may be a cyanide zinc bath. The cyanide zinc bath may contain dissolved zinc cyanide ($Zn(CN)_2$).

The electrolyte bath 114 may be an acid sulfate zinc bath. The acid sulfate bath may contain dissolved zinc sulfate ($ZnSO_4$), and have a pH<7

The electrolyte bath 114 may be an acid chloride zinc bath. The acid chloride bath may contain dissolved zinc chloride ($ZnCl_2$) and have a pH<7.

The electrolyte bath 114 may be maintained at room temperature. The electrolyte bath 114 may be maintained at room temperature in the absence of a temperature controller for the electrolyte bath 114. The electrolyte bath 114 may be heated and maintained at a constant temperature between 20° C. and 60° C.

The electroplating subsystem 102 also includes a source 116 for applying a current or voltage. The subsystem 102 applies a current or voltage via the source 116, which results in plating of zinc onto the exterior surface 115 of the current collector 112.

The deposition stage 106b shows the subsystem 102 during or after deposition (or plating) of zinc.

During the deposition stage 106b, the subsystem 102 includes the anode 110, the current collector 112, the electrolyte bath 114, and the source 116.

Using the source 116, a current or voltage from the source 116 is applied between the anode 110 and a cathode 118. The cathode 118 includes the current collector 112. The current/voltage is represented by an electron flow 120.

Application of the current/voltage between the anode 110 and the cathode 118 causes a zinc metal layer 122 to be deposited onto the current collector 112.

In an embodiment, zinc from the anode 110 may be plated onto the cathode 118 (i.e. the current collector 112) by applying a voltage difference between the two electrodes 110, 118.

In an embodiment, the zinc electroplating subsystem 102 may use a DC electroplating process. The DC electroplating process includes applying a voltage difference continuously.

In another embodiment, the subsystem 102 may use a pulse electroplating process. The pulse electroplating process includes applying a voltage or current in short, repeated pulses with rest periods in between each pulse.

In another embodiment, zinc from the anode 110 may be plated onto the cathode 118 (i.e. the current collector 112) by forcing a current to flow between the anode 110 and the cathode 118.

The electrolyte bath 114 includes $Zn^{2+}$ cations (or zincate ions) 124. The $Zn^{2+}$ cations (or zincate ions) 124 flow 125 from the anode 110 to the current collector 112 during the deposition stage 106b (i.e. during application of current/voltage).

The deposition of zinc layer 110 onto the exterior surface 115 of the current collector 112 creates the electroplated zinc electrode 150. The electroplated zinc electrode 150 is acting as cathode 118 in the subsystem 102 during the deposition stage 106b.

During the deposition stage 106b, the zinc electroplating subsystem 102 performs an electroplating process. The electroplating process deposits the zinc metal 122 onto the current collector 112. The electroplating process bonds the zinc metal 122 to the current collector 112.

The electroplating process may be a batch process. The batch process may include rack electroplating or barrel electroplating.

The electroplating process may be a continuous process. The continuous process may include roll-to-roll electroplating or reel-to-reel electroplating.

In an embodiment, the zinc metal layer 122 may have a density greater than 5 g/cc. In another embodiment, the zinc metal layer 122 may preferably have a density greater than 6 g/cc.

The zinc metal layer 122 may have a thickness between 0.05 μm to 50 mm.

The zinc metal electrode 150 can then be used as an electroplated zinc electrode in an electrochemical cell. For example, the zinc metal electrode 150 may be used as a negative electrode in an electrochemical cell.

As described above, the electroplated zinc electrode 150 (i.e. cathode 118) is used as a negative electrode 126 in the zinc metal cell 104.

The zinc metal cell 104 may be used in a primary (non-rechargeable) battery. The primary battery may be an alkaline battery. The primary battery may be a zinc-carbon battery. The primary battery may be a zinc-chloride battery. The primary battery may be a zinc-air battery.

The zinc metal cell 104 may be used in a secondary (rechargeable) battery. The rechargeable battery may be a may be a zinc-air battery. The rechargeable battery may be a zinc-ion battery. The rechargeable battery may be a zinc-halide battery. The rechargeable battery may be a nickel-zinc battery. The rechargeable battery may be a silver-zinc battery. The rechargeable battery may be a rechargeable alkaline manganese dioxide-zinc (RAM) battery. The rechargeable battery may be a zinc-iron battery. The rechargeable battery may be a zinc-cesium battery.

The zinc metal cell 104 includes the negative electrode 126 (i.e. the electroplated zinc electrode 150), a positive electrode 128, and an electrolyte 130. The negative electrode 126 is ionically connected to the positive electrode 128 by the electrolyte 130.

As described, the negative electrode 126 is an electroplated zinc electrode fabricated using the zinc electroplating subsystem 102. In particular, the negative electrode 126 of the zinc metal cell 104 is the cathode 118 from the zinc electroplating subsystem 102.

The negative electrode 126 includes the zinc metal layer 122 (shown as a black band on the right of the negative electrode 126). The zinc metal layer 122 is in direct electrical contact with the current collector 112.

The zinc metal layer 122 includes a first side facing the current collector 112 and a second side facing the electrolyte 130.

The current collector 112 in the cell 104 comprises an electrically conductive surface. The current collector 112 may be in the form of a foil, wire, sheet, plate, foam, sponge, mesh, rod, bar, can, or lid.

The electrolyte 130 may comprise an aqueous solution. The electrolyte 130 may comprise a non-aqueous solution. The electrolyte 130 may comprise a solid-state membrane. The electrolyte 130 may comprise an ionomer.

The positive electrode 128 may be an air electrode.

The positive electrode 128 may be an intercalation electrode.

The positive electrode 128 may be a conversion electrode.

The positive electrode 128 may be an inert substrate at which redox molecules dissolved in the electrolyte 130 can reduce/oxidize.

During discharge under an electrical load 132, zinc of the zinc layer 122 is stripped from the negative electrode 126 while $Zn^{2+}$ cations (or zincate ions) 134 migrate towards the positive electrode 128 through the electrolyte 130.

The flow of $Zn^{2+}$ cations (or zincate ions) 134 is represented by arrows above and below the $Zn^{2+}$ cations (or zincate ions) 134.

The cell 104 includes a flow of electrons 136 throughout the circuit.

Figure 4:
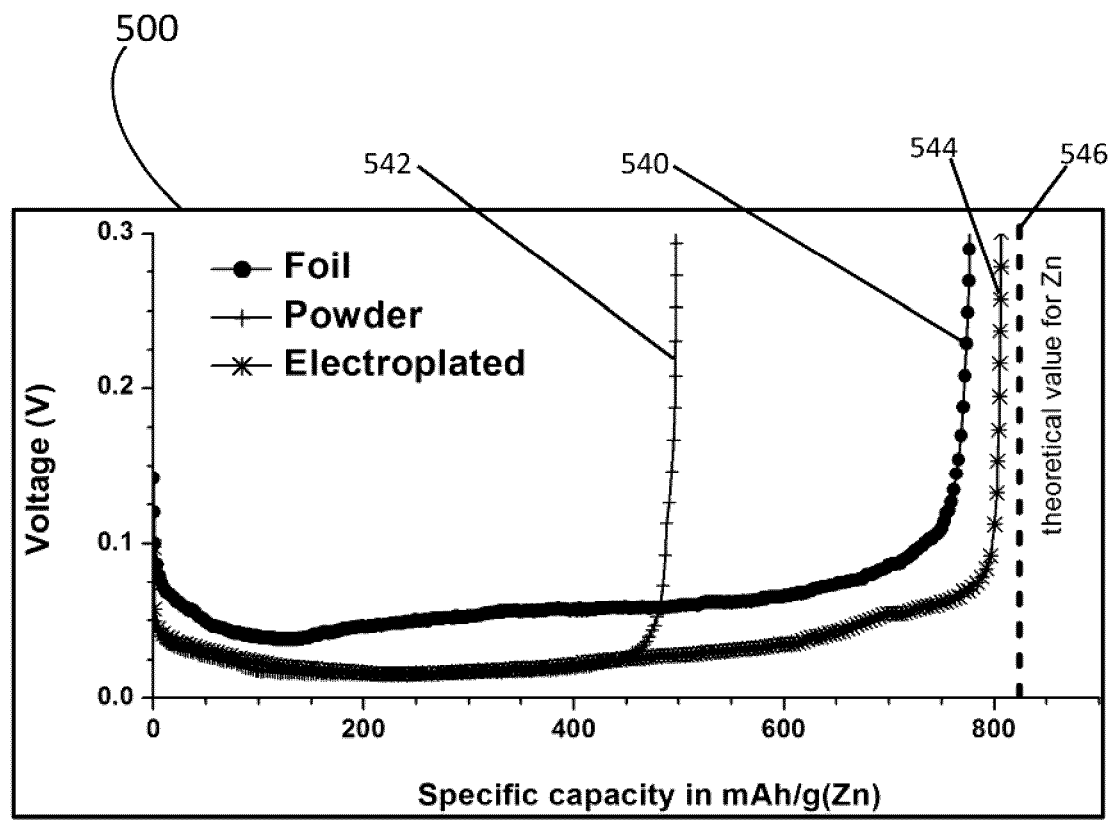
FIG. 4 is a graph of voltage (V) versus specific capacity (mAh/g) for three different zinc electrodes.

If the electroplated zinc metal electrode 150 is to be used in a rechargeable cell, it may be preferable to conduct the electroplating (for example electroplating via the zinc electroplating subsystem 102) in an electrolyte (i.e. electrolyte bath 114) which is similar to the electrolyte 130 used in the cell 104. This is so that the morphology of the electroplated zinc layer 122 may be similar to that which will be plated repeatedly during cycling of the cell 104. An example of this is shown in FIG. 4, described below.

Figure 2:
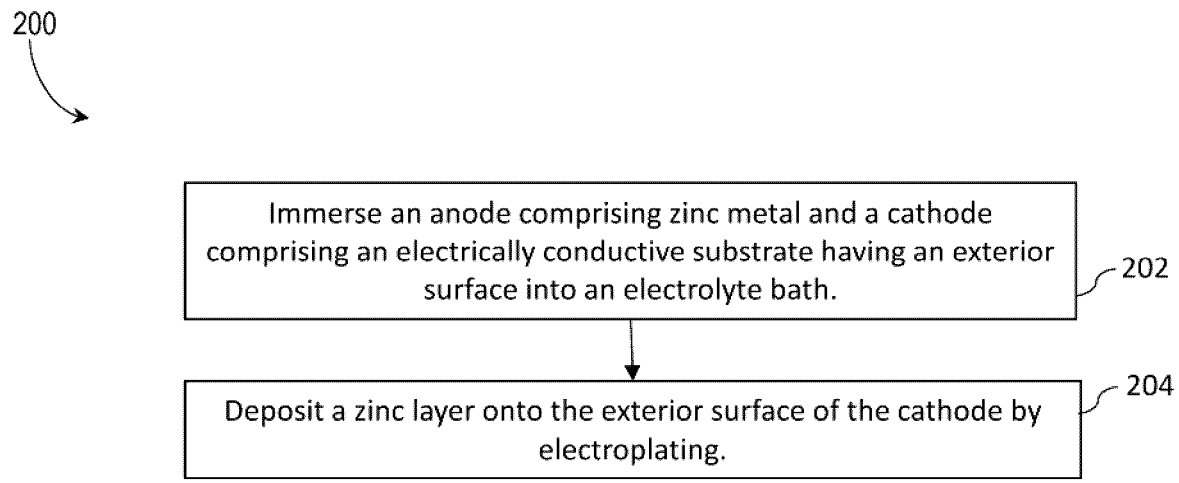
FIG. 2 is a flow diagram of a method of fabricating an electroplated zinc electrode, in accordance with the present system, devices, and methods.

FIG. 2 shows a flow diagram of a method of creating a zinc-electroplated electrode. The system used for the method of FIG. 2 may be similar or identical to systems 106a and 106b of FIG. 1.

At step 202, an anode comprising zinc metal and a current collector or cathode comprising an electrically conductive substrate having an exterior surface are both immersed within an electrolyte bath. The anode and cathode may be partially or completely submerged in the electrolyte bath. The anode and cathode are both electrically connected to a source of a current or voltage. The anode, cathode, source, and electrolyte bath create a circuit through which the current or voltage may travel.

At step 204, a zinc layer is deposited onto the exterior surface of the cathode by electroplating. That is a current or voltage is applied from the source such that Zn-containing ions from the zinc metal anode are oxidized and dissolve into the electrolyte bath. As the concentration of Zn-containing ions in the electrolyte bath increases Zn-containing ions are reduced at the exterior surface of the cathode and a layer of zinc metal is deposited onto the exterior surface of the cathode.

This process of electrodeposition of zinc onto the exterior surface of the cathode may continue until the final electroplated zinc layer may has a thickness of 0.05 μm to 50 mm.

The electrolyte bath may include $Zn^{2+}$ ions or $[Zn(OH)_4]^{2-}$ ions.

The process of electroplating may be a batch process wherein several cathodes are hung on a rack and immersed in the electrolyte bath with at least one anode (rack electroplating) or several cathodes may be immersed in an electrically conductive barrel within or holding aqueous electrolytes and anode (barrel electroplating).

The process of electroplating may be a continuous process such as roll-to-roll or reel-to-reel electroplating.

Method 200 may include applying a voltage difference between the anode and the cathode to electroplate the cathode. This voltage difference may be applied continuously (DC electroplating) or may be applied in short, repeated pulses (pulsed electroplating).

Method 200 may include forcing a current to flow from the anode to the cathode to electroplate the cathode.

Figure 3A:
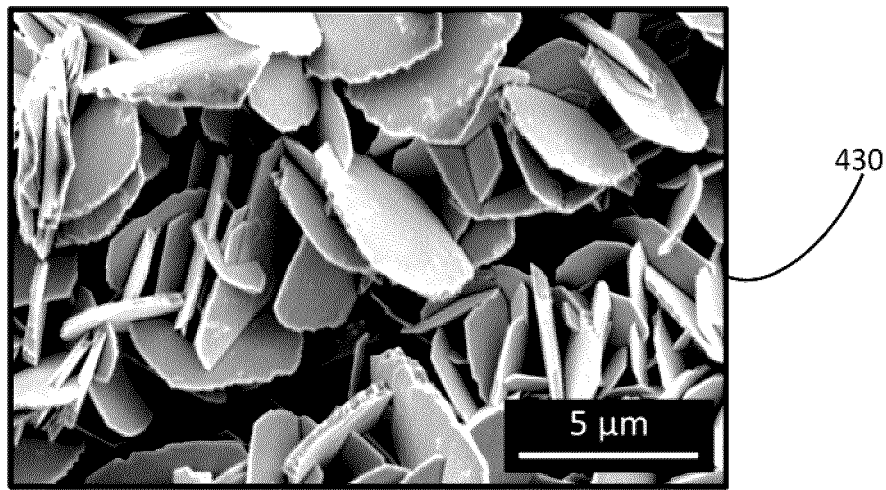
FIG. 3A is a scanning electron microscope (SEM) image of zinc metal electroplated onto copper foil.
Figure 3B:
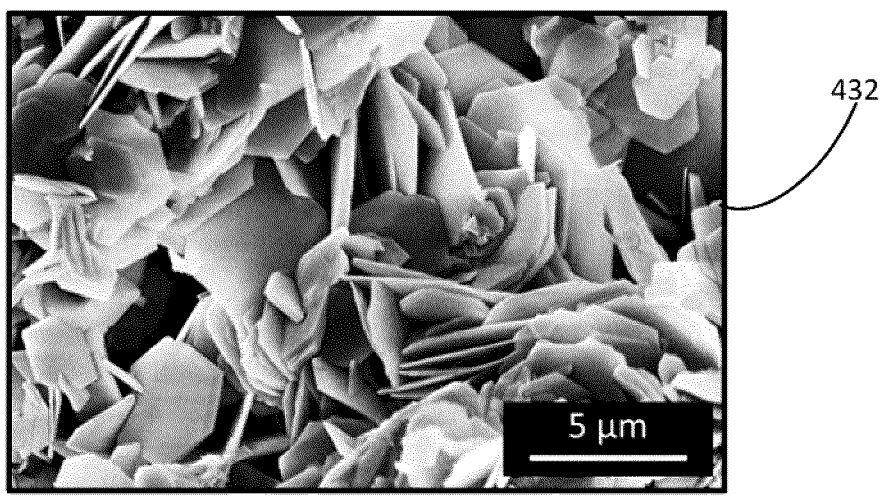
FIG. 3B is an SEM image non-electroplated zinc metal foil electrode which was cycled in a Zn∥Zn symmetric cell.

Referring now to FIG. 3, shown therein are two scanning electron microscope (SEM) images 430, 432 of the surface morphology of zinc metal, according to an embodiment.

Image 430 shows zinc metal which has been electroplated onto copper foil. Image 430 shows an example electroplated zinc electrode which may be fabricated using the zinc electroplating subsystem 102 of FIG. 1.

image 432 is zinc metal foil after repeated cycling in a Zn∥Zn symmetric cell.

The electrolyte bath (e.g. electrolyte bath 114 of FIG. 1) used to plate the zinc in image 430 was a zinc chloride bath including 30 g/L zinc chloride, 25 g/L boric acid, and 150 g/L sodium chloride.

A voltage difference of 1 V between the anode and cathode was applied for 60 minutes and the corresponding zinc coating was approximately 100 μm thick. The plating current density was approximately 30 mA/cm². This electrolyte bath composition may be appropriate for producing zinc electrodes for use in cells that have a near-neutral slightly acidic pH (pH ~3-7).

The Zn∥Zn cell in image 432 was cycled 25 times in 1 M $ZnSO_4$ electrolyte at a current density of 1 mA/cm² to a capacity of 1 mAh/cm².

It should be noted that several different electrolytes were examined and listed in Table 1 below. The performance of these electrolytes (current density, zinc morphology, density of zinc deposits, etc.) varied greatly.

TABLE 1

Different electrolyte bath compositions used for fabricating electroplated zinc electrodes.

| Electrolyte Bath | Component 1 | Component 2 | Component 3 | Component 4 |
|---|---|---|---|---|
| 1 | 1 M ZnSO$_4$ | | | |
| 2 | 1 M ZnSO$_4$ | 10 vol% ethylene glycol | | |
| 3 | 1 M ZnSO$_4$ | 10 vol% ethylene glycol | 0.15 M H$_3$BO$_3$ | |
| 4 | 35 g/L ZnCl$_2$ | 200 g/L (NH$_4$)$_2$SO$_4$ | | |
| 5 | 35 g/L ZnCl$_2$ | 200 g/L (NH$_4$)$_2$SO$_4$ | 0.3 g/L gelatin | 1.2 g/L 3,4,5-trimethoxybenzaldehyde |
| 6 | 35 g/L ZnCl$_2$ | 200 g/L (NH$_4$)$_2$SO$_4$ | 1 g/L dextrin | 1 g/L 3,4,5-trimethoxybenzaldehyde |
| 7 | 30 g/L ZnCl$_2$ | 150 g/L NaCl | 25 g/L H$_3$BO$_3$ | |
| 8 | 30 g/L ZnCl$_2$ | 150 g/L NaCl | 25 g/L H$_3$BO$_3$ | 500 ppm ethyl vanillin |
| 9 | 1 M Zn(O$_2$CCH$_3$)$_2$ | | | |

Image 432 is of a zinc metal foil electrode (not electroplated) which was cycled in a Zn∥Zn symmetric cell. Here, the electrolyte was 1 M ZnSO$_4$.

One advantage of using a zinc-electroplated electrode disclosed herein (e.g. electrode 150 of FIG. 1) may be that the electrode maintains its morphology during cycling of a cell.

By contrast, when starting with dense zinc (such as the foil in image 432) as an electrode, as the zinc electrode undergoes repeated stripping/plating cycles, it changes its morphology from smooth and planar to a 3D morphology and significant volume changes occur. The plates shown in image 432 grow outward into the separator and can short-circuit the cell.

It should be noted that the plate-like morphology of zinc metal plated in cells or cycled in cells using near neutral electrolytes may be preferred over a dendritic morphology which is common in cells cycled in alkaline electrolytes.

Referring now to FIG. 4, shown therein is a graph 500 of voltage vs. specific capacity for different zinc electrodes.

The zinc electrodes shown in FIG. 4 include a foil electrode (line 540), a powder electrode (line 542), and a zinc-electroplated electrode (line 544). The zinc-electroplated electrode is an example of an electroplated zinc electrode that may be fabricated and used by the system 100 of FIG. 1.

The theoretical value for Zn is represented by dashed line 546.

The foil electrode was 30 μm thick dense zinc foil (purchased from Linyi Gelon LIB Co., Ltd.).

The powder electrode was powdered zinc (<150 μm particles purchased from Sigma Aldrich) slurry cast onto 25 μm thick copper foil.

The zinc-electroplated electrode was electroplated zinc on 25 μm thick copper foil.

The negative electrode for each cell was a sheet of zinc foil, the electrolyte was 1 M ZnSO$_4$, and glass fiber separators were used.

FIG. 4 compares the specific capacity of the three different zinc electrodes (foil, powder, zinc-electroplated). The theoretical specific (or gravimetric) capacity for zinc metal is 820 mAh/g (line 546) based off of Faraday's constant (26.8 Ah/mol). The actual specific capacity was measured by weighing the initial mass of zinc metal in each electrode and then stripping the zinc by applying a current of 0.6 mA/cm$^2$ to a voltage cut-off of 0.7 V vs. Zn/Zn$^{2+}$. The capacity of stripped zinc in mAh over the initial mass of zinc yields the specific capacity in the units of mAh/g. This galvanostatic stripping experiment may be equivalent to the reaction that would occur at the zinc electrode during discharge of a primary (non-rechargeable) cell.

For the dense zinc foil electrode 540, a high specific capacity of 782 mAh/g was achieved. The overpotential for the stripping process of the zinc foil 540 was higher than the other electrodes due to its low active surface area.

The powdered zinc electrode 542 had a low overpotential, but a very low specific capacity of 498 mAh/g. If the powdered zinc electrode 542 were used in a cell, only 61% of the negative electrode would be utilized. The low capacity is due to a large portion of the zinc metal being inactive by having high particle-particle resistance. Since zinc is easily oxidized in air and the particles of the powdered electrode 542 are held together with a binder rather than fused, oxidation of the outer surface of the particles can cause the core of the particles to be electrochemically inaccessible.

In contrast, the electroplated zinc electrode 544 had a low overpotential and had close to 100% of the theoretical specific capacity (808 mAh/g). This indicates that the electrode 544 has a sufficiently high electrochemically active surface area and the bulk of the zinc metal in the electrode 544 is accessible.

Depending on the electrolyte chosen for the plating bath (e.g. electrolyte bath 114 of FIG. 1), the electroplating parameters may easily be changed to tune the morphology and density of the electroplated zinc electrode. In particular, an optimum current density exists, minimizing hydrogen gas evolution at the cathode, and resulting in a maximum density of the plated zinc.

Figure 5:
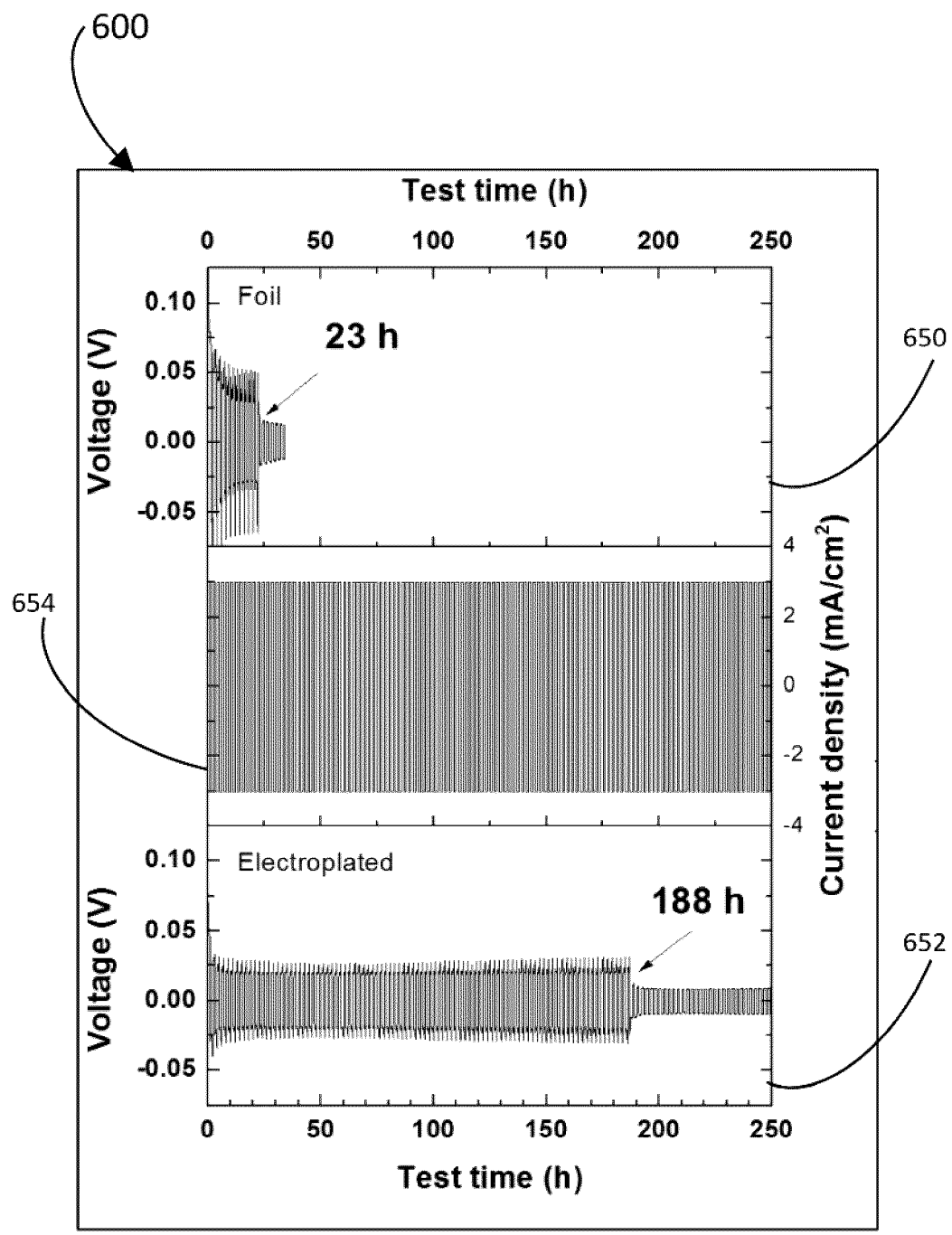
FIG. 5 is two graphs of voltage (V) over time for a foil electrode and an electroplated electrode as a function of current density (mA/cm$^2$)

Referring now to FIG. 5, shown therein is a graph 600 comparing the cycling performance of Zn∥Zn symmetric cells with 1 M ZnSO$_4$ electrolyte using 30 μm thick dense zinc foil electrodes (top panel 650) and electroplated zinc on copper foil electrodes (bottom panel 652).

The middle panel 654 displays the current density applied to each cell which corresponds to 3 mA/cm$^2$ to a cycling capacity (discharge or charge) of 3 mAh/cm$^2$.

Examining the potential use of the zinc electrodes for rechargeable zinc metal cells, Zn∥Zn symmetric cells were used to conduct stripping/plating cycles.

In FIG. 5, cells were cycled in 1 M ZnSO$_4$ electrolyte at a current density of 3 mA/cm$^2$ to an areal capacity of 3 mAh/cm$^2$. The applied current density vs. time is displayed in the middle panel 654.

The voltage vs. time plots for the cell using 30 μm thick dense zinc foil electrodes are displayed in the top panel 650. For this cell, the sudden decreased voltage polarization which occurs around 23 hours indicates an internal short-circuit. This signature was used to determine the cycle life of these cells and is the result of current travelling directly from one electrode to the other by connection of zinc metal.

The voltage vs. time plots for the cell using electroplated zinc on copper foil electrodes are displayed in the bottom panel 652. The cycle life of this cell was extended to 188 hours. Notably, the cell with electroplated zinc electrodes also had a much lower polarization compared to the cell with zinc foil electrodes. The extended cycle life and lower polarization may be attributed to a higher active surface area and more uniform current distribution throughout the electroplated electrodes.

Figure 6:
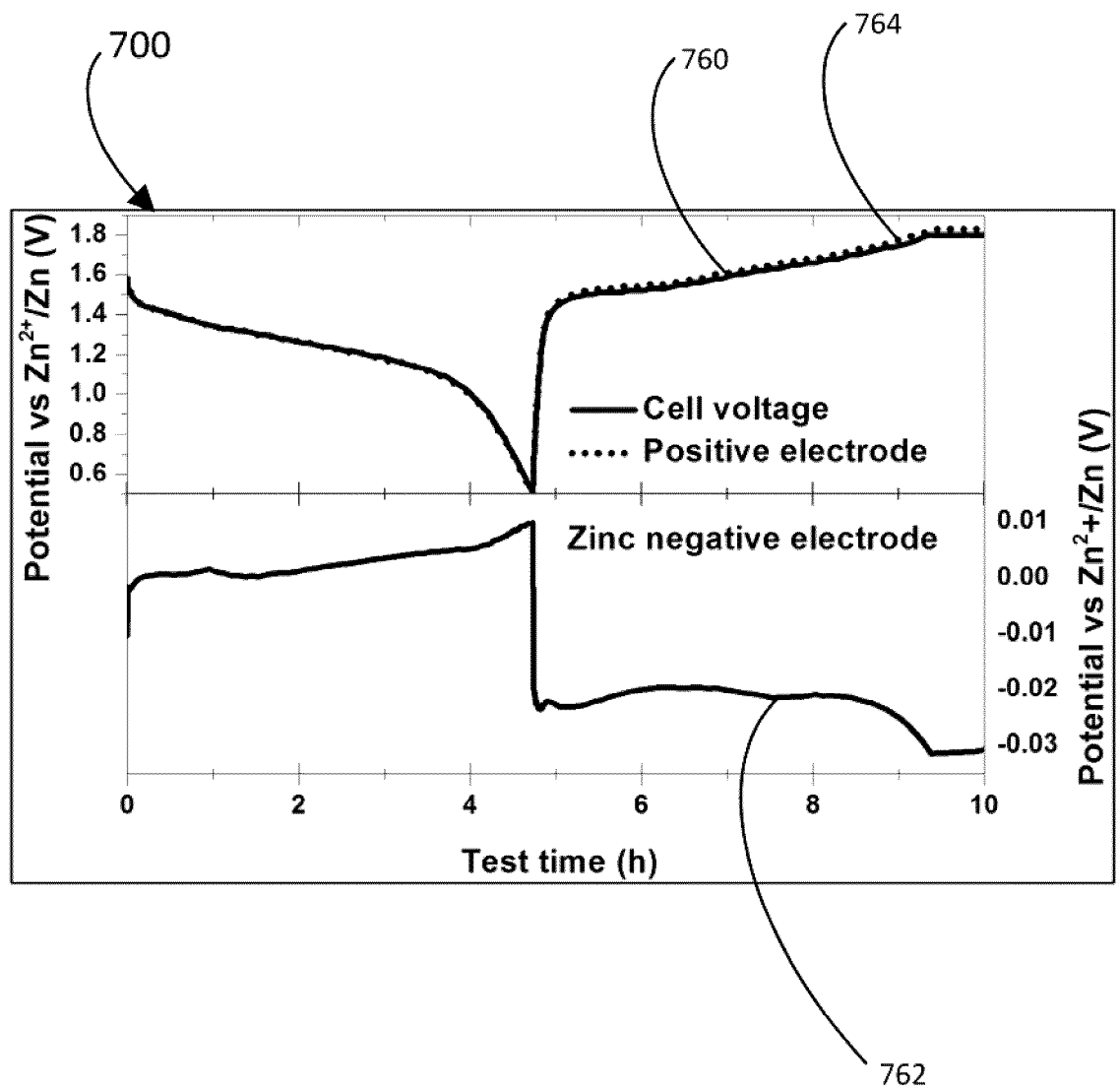
FIG. 6 is a graph showing the potential of a positive electrode and negative electrode, respectively, versus the potential of $Zn^{2+}/Zn$ over time, according to an embodiment.

Referring now to FIG. 6, shown therein is a graph 700 displaying a discharge/charge cycle of a Zn||electrolytic manganese dioxide (EMD) cell with 1 M $ZnSO_4$+0.1 M $MnSO_4$ electrolyte using an electroplated zinc on copper foil negative electrode and an EMD positive electrode.

A piece of zinc foil was used as the reference electrode in a three-electrode setup.

The top panel 750 shows the potential of the EMD positive (working, WE) electrode vs. $Zn/Zn^{2+}$ (dotted line 764) and the full cell voltage (WE-CE) (solid line 760).

The bottom panel 752 shows the potential of the electroplated zinc negative (counter, CE) electrode vs. $Zn/Zn^{2+}$ (solid line 762).

FIG. 6 is an example of an electroplated zinc electrode being used at the negative electrode in a rechargeable zinc metal battery.

In this example, the positive electrode is electrolytic manganese dioxide (EMD) and the electrolyte is 1 M $ZnSO_4$+0.1 M $MnSO_4$ dissolved in $H_2O$.

In this example, a zinc foil reference electrode was added to monitor the potentials of the negative and positive electrodes separately.

The negligible polarization of the electroplated zinc negative electrode ensures that the cell can be fully discharged and fully recharged within the given voltage window.

The electroplating parameters may easily be changed to tune the thickness and capacity of the electroplated zinc electrode. In particular, capacity is proportional to both current density and duration of the plating process. As a result, electroplated zinc electrodes can be produced to match the capacity of any positive electrode in a zinc metal battery or provide a desired excess of zinc metal.

A zinc-electroplated electrode, as created by the systems and methods discussed in FIGS. 1 and 2 and measured and observed by experiments shown in FIGS. 3-6, when used in a primary or secondary electrochemical cell (e.g. cell 104 of FIG. 1), may provide one or more advantages including any one or more of a higher active surface area, more accessible zinc metal, a more uniform current distribution, a lower polarization, and a lower overpotential than conventional zinc electrodes currently used in cells.

The following paragraphs describe the experimental methods used herein and are not intended to limit the scope of the present disclosure.

The powdered zinc electrodes (used as a comparative example in FIG. 4) were prepared by casting a slurry of zinc powder (<150 μm particles, Sigma Aldrich) and polyvinyl butyral (PVB) binder (Butvar 98, Sigma Aldrich) in 2-propanol (Sigma Aldrich) solvent in the weight ratio of 95:5 onto a copper foil (25.4 μm thick, McMaster Carr). After casting, the electrodes were dried at room temperature for 2 hours.

The 30 μm thick zinc foil used as a comparative example (FIGS. 3, 4, 5) and as counter/reference electrodes in the galvanic stripping experiments (FIG. 4) was purchased from Linyi Gelon LIB Co., Ltd. and used directly after cleaning the surface with 2-propanol.

The electroplated zinc electrodes shown in this work were fabricated by submerging copper foil into a bath containing 0.3 g/L $ZnCl_2$, 0.25 g/L $H_3BO_3$, and 150 g/L NaCl. The anode was either a sheet of zinc metal foil (80 μm thick, Linyi Gelon LIB Co., Ltd.) or zinc metal hexagonal pieces (99.995%, Roto Metals) in a titanium mesh basket (Titan Metal Fabricators). A current density of approximately 30 $mA/cm^2$ was maintained for 30 to 60 minutes by controlling the voltage with a DC power supply. The applied voltage varied depending on the electrolyte agitation method and distance between the anode and cathode. The electrolyte was agitated by either mechanical stirring or by liquid circulation using a pump.

All electrochemical cells (used in FIG. 3B image 432, and FIGS. 4, 5, and 6) were assembled using a homemade plate design including a rubber gasket sandwiched between two acrylic plates. The acrylic plates were bolted together and housed the electrode stack (negative/separator/positive). The electrode stack was compressed together between Ti plates by external screws which also served as electrical connections. The Zn||Zn symmetric cells which were cycled (FIG. 4 image 432 and FIG. 6) were prepared using two pieces of the same zinc electrode (30 μm thick zinc foil, powder zinc on Cu foil, or electroplated zinc on Cu foil) as both the negative and positive electrodes. In the galvanic stripping experiments (FIG. 5), the negative electrode was a piece of 80 μm thick zinc foil and the positive electrode was either 30 μm thick zinc foil, powder zinc on Cu foil, or electroplated zinc on Cu foil. The negative electrode was 5.5 cm×5.5 cm and the positive was 5 cm×5 cm. The separator was a single piece of glass fiber filter membrane (~300 μm thick). The Zn||Zn cells were all cycled on a CT2001A battery tester (Landt Instruments) at room temperature (23±2° C.).

The rechargeable zinc metal cell in FIG. 6 was assembled using an electroplated zinc metal negative electrode (5.5 cm×5.5 cm), paper filters as the separator with ~3 mL of electrolyte, and a positive electrode (5 cm×5 cm) including a coating of EMD on a current collector. A small piece of zinc foil (30 μm thick, Linyi Gelon LIB Co., Ltd.) was sandwiched between layers of the paper filter separators to act as a reference electrode. The positive electrode of the cell shown in FIG. 6 was prepared by casting a slurry of electrolytic manganese dioxide (EMD, Tronox), Vulcan XC72 carbon black (Cabot Corp.), and polyvinylidene fluoride (PVDF) binder (HSV900, Arkema) in N-methyl-2-pyrrolidone (NMP) solvent in the weight ratio of 93.5:4:2.5 onto a sheet of roughened Ni foil (Targray). After casting, the electrode was dried at 120° C. under vacuum for 2 hours and then calendared. The electrolyte used in this cell was 1 M $ZnSO_4$+0.1 M $MnSO_4$ in water. Discharging and charging of this cell was controlled with a VSP potentiostat/galvanostat (Biologic Instruments) at room temperature (23±2° C.). A constant current (CC) discharge was performed at 0.6 $mA/cm^2$ to a voltage cut-off of 0.5 V and a constant current-constant voltage (CC-CV) charge was performed at 0.6 $mA/cm^2$ to 1.8 V and holding the voltage at 1.8 V until the current dropped below 10 mA.

While the above description provides examples of one or more apparatus, methods, or systems, it will be appreciated that other apparatus, methods, or systems may be within the scope of the claims as interpreted by one of skill in the art.

The invention claimed is:

1. A method of fabricating and using a zinc negative electrode, the method comprising:
    fabricating an electroplated zinc electrode comprising a layer of zinc metal bonded to a surface of a current collector using an electroplating process, wherein the electroplating process uses a zinc electroplating system, the zinc electroplating system including:
    an anode comprising zinc metal;
    a cathode including the current collector for electroplating the layer of zinc thereon, the current collector comprising an electrically conductive substrate; and
    an electrolyte bath comprising Zn2+ cations or [Zn(OH)4]2− ions;
    wherein the electroplating process bonds the zinc metal to the current collector; and using the electroplated zinc electrode as a negative electrode in a zinc metal cell, wherein the zinc metal cell comprises:
the negative electrode;
a positive electrode; and
an aqueous electrolyte having a near-neutral slightly acidic pH.

2. The method of claim 1, wherein the zinc metal layer has a density greater than 5 g/cc.

3. The method of claim 1, wherein the zinc metal layer has a thickness between 0.05 µm to 50 mm.

4. The method of claim 1, wherein the cathode is electroplated using: a batch process, wherein the batch process includes rack electroplating or barrel electroplating; or a continuous process, wherein the continuous process includes roll-to-roll electroplating or reel-to-reel electroplating.

5. The method of claim 1, wherein the electrolyte bath is an alkaline non-cyanide zinc bath, a cyanide zinc bath, an acid sulfate zinc bath, or an acid chloride zinc bath.

6. The method of claim 1, wherein the zinc metal from the anode is plated onto the current collector by:
applying a voltage difference between the anode and the cathode, wherein the voltage difference is applied using a constant voltage or a voltage pulse; or
applying a current between the anode and the cathode, wherein the current is applied using a constant current or a current pulse.

7. The method of claim 1, wherein the zinc metal cell is used in a primary non-rechargeable battery, and wherein the primary non-rechargeable battery is an alkaline battery, a zinc-carbon battery, a zinc-chloride battery, or a zinc-air battery.

8. The method of claim 1, wherein the zinc metal cell is used in a rechargeable battery, and wherein the rechargeable battery is a zinc-air battery, a zinc-ion battery, a zinc-halide battery, a nickel-zinc battery, a silver-zinc battery, a rechargeable alkaline manganese dioxide-zinc battery, a zinc-iron battery, or a zinc-cesium battery.

* * * * *